United States Patent [19]

Gomez

[11] 4,356,728
[45] Nov. 2, 1982

[54] DEVICE FOR MEASURING THE LEVEL OF A LIQUID

[75] Inventor: Michel Gomez, Joinville-Le-Pont, France

[73] Assignee: e.d. VEGLIA, France

[21] Appl. No.: 149,170

[22] Filed: May 15, 1980

[30] Foreign Application Priority Data

May 21, 1979 [FR] France ............................. 79 12908

[51] Int. Cl.³ ...................... G01F 23/24; G01K 7/16
[52] U.S. Cl. ........................................ 73/295; 331/66; 340/622; 374/183
[58] Field of Search .................. 73/292, 295; 340/605, 340/622, 620; 331/66

[56] References Cited

U.S. PATENT DOCUMENTS

| | | |
|---|---|---|
| 3,299,369 | 1/1967 | Vercellotti et al. ............. 331/66 X |
| 3,932,852 | 1/1976 | Hill ................................. 340/620 X |
| 4,116,045 | 9/1978 | Potter .............................. 73/295 X |
| 4,150,573 | 4/1979 | Iinuma et al. .................... 331/66 X |
| 4,163,391 | 8/1979 | Bezard et al. ........................ 73/295 |
| 4,187,723 | 2/1980 | Golden et al. ....................... 73/295 |
| 4,215,486 | 8/1980 | Heyer et al. .................... 340/620 X |
| 4,253,064 | 2/1981 | McBride, Jr. .................... 331/65 X |
| 4,291,280 | 9/1981 | Gardner ............................... 331/65 |

Primary Examiner—Daniel M. Yasich
Attorney, Agent, or Firm—Jacobs & Jacobs

[57] ABSTRACT

A device for measuring the level of a liquid, comprising a high temperature coefficient sensor immersed in the liquid, a detection circuit connected to the sensor for delivering a voltage indicative of the level of liquid, a memory circuit to which said voltage is applied, a sawtooth signal generator circuit and, a comparator. The output signals of the memory circuit and of the sawtooth signal circuit are coupled to input terminals of the comparator, and a display galvanometer is connected to the output of said comparator.

2 Claims, 4 Drawing Figures

DEVICE FOR MEASURING THE LEVEL OF A LIQUID

The present invention relates to a device for measuring the level of a liquid in a tank by means of a high temperature coefficient resistor immersed in the liquid, and more particularly to a device for measuring the level of oil in the crankcase of an automobile vehicle.

For detecting a level of liquid, it is known to arrange a high temperature coefficient sensor in the tank and to apply a constant current thereto. If the level is low, the sensor is in the air and its temperature, therefore its resistance, increases. If, on the contrary, the sensor is immersed in the liquid, its temperature increases little. The voltage at the terminals of the sensor is thus indicative of the level of liquid, and a voltage proportional to the level of liquid may be obtained by means of a suitable detection circuit connected to the sensor.

This voltage has heretofore been used for an "all or nothing" detection. When the level of liquid goes below a predetermined value, a warning is triggered off, for example by a lamp lighting up.

However, it appears desirable to have a permanent display of the level on the dial of a galvanometer and it is an object of the invention to meet this need.

To this end, the invention provides a device for measuring the level of a liquid, comprising a high temperature coefficient sensor, immersed in the liquid, a detection circuit connected to the sensor to supply a voltage indicative of the level of liquid, which device further comprises a memory circuit to which said voltage is applied, a saw-tooth signal generator circuit, a comparator to which are applied, on the one hand, the output signal of the memory circuit and, on the other hand, the saw-tooth signal, and whose output is connected to a display galvanometer.

The output signal of the comparator is a square waveform whose width is a function of the level of liquid. The galvanometer achieves a mechanical integration of these square waveforms and furnishes the level of liquid on its dial.

The memory circuit preferably comprises a second comparator having one input connected to earth and receiving said voltage on the other input, a capacitor connected to the output of the comparator and an amplifier mounted between the output of the second comparator and the input of the first-mentioned comparator.

The invention will be more readily understood on reading the following description with reference to the accompanying drawings, in which.

Figure 1:
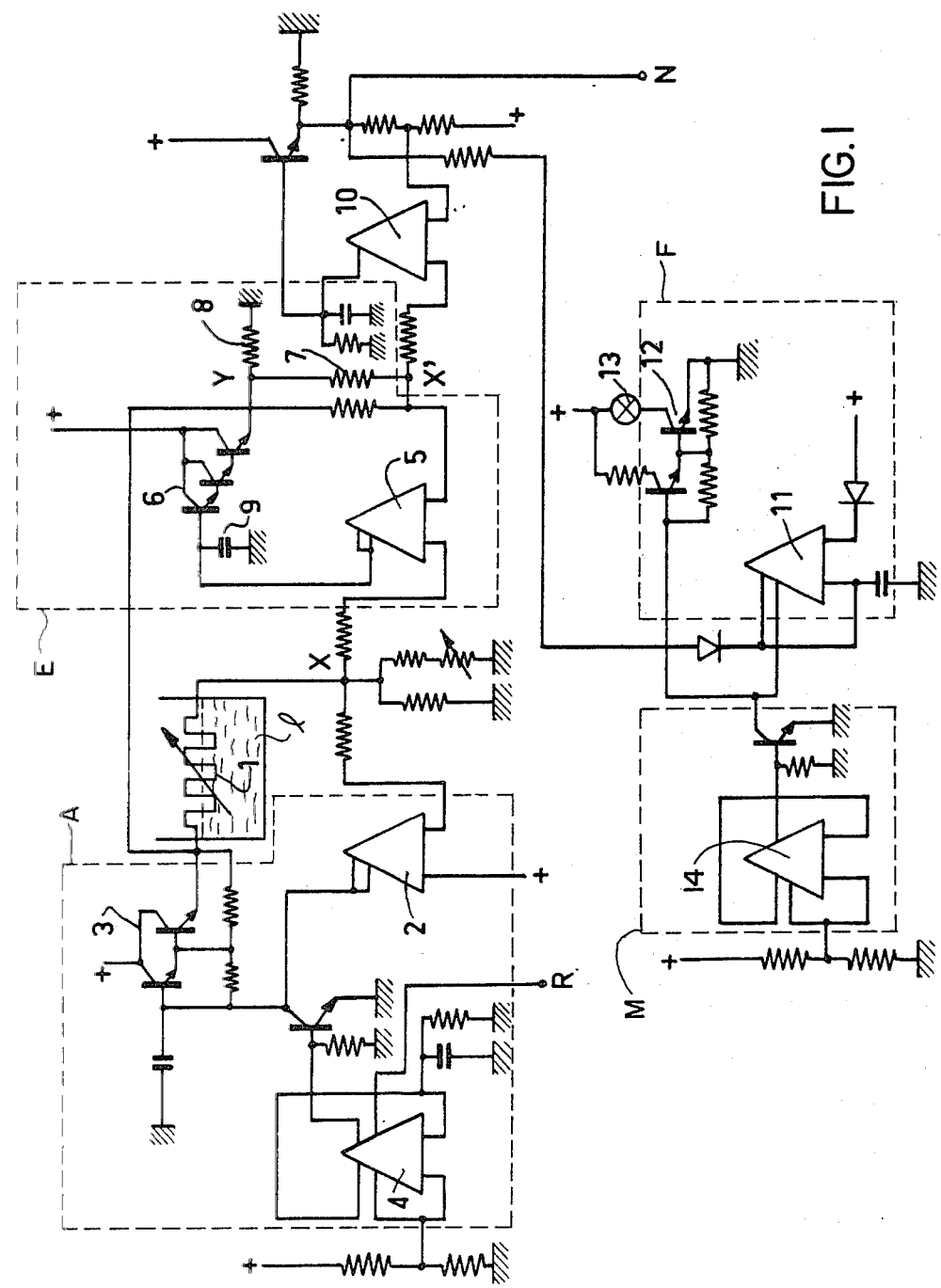
FIG. 1 is a diagram of a detection circuit connected to a sensor associated with a warning circuit controlled by a voltage indicative of the level of the liquid sensed by the sensor.

Referring now to the drawings, the circuit of FIG. 1 comprises a high temperature coefficient resistor 1 acting as a sensor, which is immersed in a liquid 1 whose level it is desired to measure.

Figure 1A:
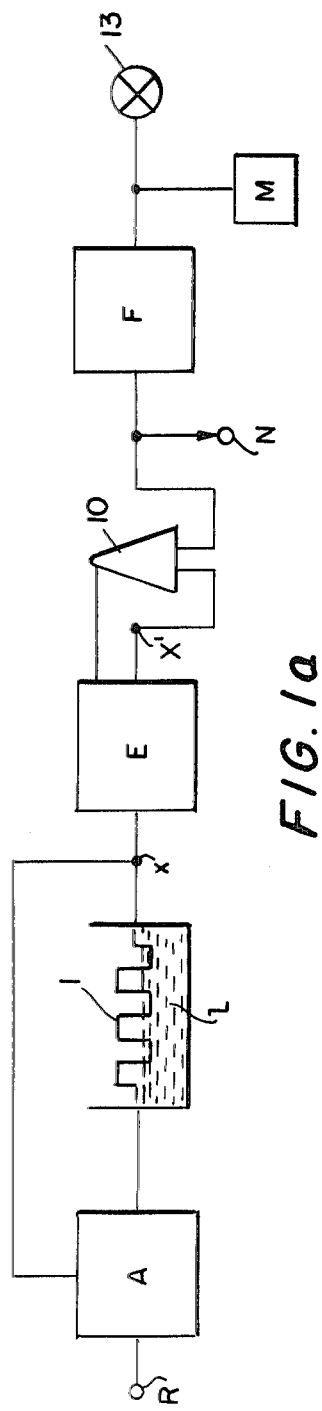
FIG. 1a is a schematic block diagram of the circuit of FIG. 1.

FIG. 1 shows blocks A, E, F and M, and FIG. 1a depicts these blocks in operative association. These blocks (as well as those of FIGS. 2 and 2a) are diagramatic only, to facilitate the showing of functional relationships among groups of the circuit components, and do not represent thay any such group is necessarily available commercially as a single unit. As seen in FIG. 1a, a high temperature coefficient resistor 1, which acts as a sensor, is immersed in a liquid 1 whose level it is desired to measure. The snesor 1 is supplied with pulses of current of equal amplitude by the means of block A. The circuit is supplied cyclically, for instance, for two seconds every 20 seconds. The voltage at point X is applied to the circuit of block E which is arranged to deliver at point X' a voltage independent of the ambient temperature. Said voltage is applied to an amplifier 10, the output of which is applied to a warning circuit F controlling a lamp 13. The circuit M provides an intermittent switching of the lamp 13.

As seen in FIG. 1, block A includes a comparator 2 and a Darlington circuit 3. A comparator 4 acting as an astable oscillator (i.e. an oscillated flip-flop) drives the Darlington circuit so that the sensor 1 is cyclically supplied with current, for example square pulses for a duration of 2 seconds every 20 seconds. In detection circuit E, the output of the comparator 5 is connected to a Darlington circuit 6 those output Y is connected via a resistor 7 to point X' and via a resistor 8 to earth and a capacitor 9 is also connected to the output of the comparator 5.

The comparator 5 makes it possible to eliminate the influence of the initial temperature of the liquid and of the ambient temperature on the measurement. In fact, the capacitor 9 connected to the output of the comparator 5 is charged in accordance with the stabilized voltage $U_x$ at point X, which is dependent on ambient temperature T since the resistance of the sensor is dependent on T.

The flow of current in the sensor 1 results in a temperature rise in the sensor which is variable with the rate of immersion of the sensor in the liquid. Accordingly, the voltage $U_s$ at the terminals of the sensor 1 is increased and the voltage $(U_x - U_s)$ derived at the output of the comparator 5 becomes lower than the voltage which has charged the capacitor 9. No current flow then occurs from the capacitor 9 towards the comparator 5.

The liquid level information is provided by the voltage at X' which, due to the compensation made by the comparator 5, is not dependent on the ambient temperature T.

This voltage $U_x$ of detection circuit E is applied to a cmparator 10 connected as an amplifier and presenting a high gain.

The output of the amplifier 10 is connected to a warning circuit F which comprises a comparator 11 acting as a bistable oscillator, i.e. having two stable states, therefore having an output looped on its input. The other output of the comparator 11 drives the base of a Darlington circuit 12 the output of which is connected to a warning lamp 13. The other input of the comparator 11 receives a reference voltage which sets the rate of immersion of the sensor for which warning occurs by the lamp 13 switching on.

Circuit M includes a comparator 14 acting as an astable oscillator operating at a frequency of the order of 1 to 2 Hz to inhibit the flow of current to the base of the Darlington circuit 12. This provides an intermittent switching on of lamp 13 so as to enhance the warning effect for the user.

The above-described warning circuit functions as an "all or nothing" circuit (go-no-go) and does not enable the level of liquid to be permanently known. The circuit of FIG. 2 meets this need by allowing the display of the voltage collected at the terminal N on a galvanometer.

Figure 2A:
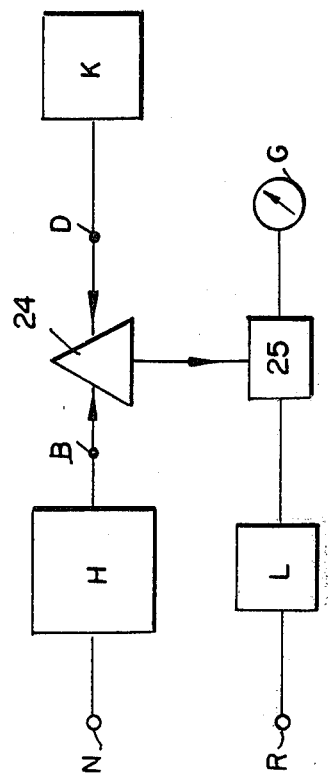
FIG. 2a is a simplified block diagram of the circuit shown in FIG. 2.
Figure 2:
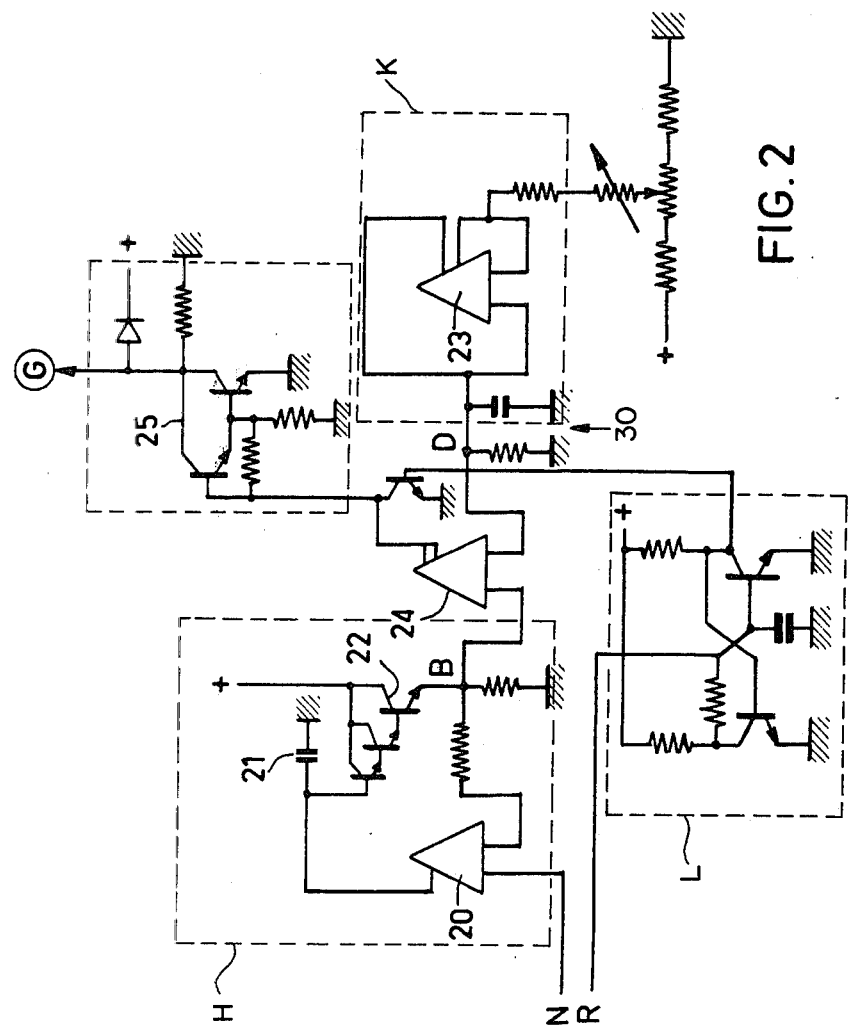
FIG. 2 is a diagram of the circuit to which is applied the voltage delivered by the circuit of FIG. 1 and which comprises an analog memory circuit and a saw-tooth signal generator circuit associated with a comparator controlling a galvanometer.

As shown in FIGS. 2 and 2a, the terminal N is connected to an analog memory circuit H. The output B of circuit H is connected to one input of a comparator 24 and the other input of comparator 24 is connected to the output D of a saw-tooth voltage generator K. The output of comparator 24 is connected to a Darlington circuit 25 of which the output controls a galvanometer G. The base of circuit 25 is connected to a circuit L connected to the input R of circuit A and adapted to cyclically inhibit the current applied to said base of circuit 25.

Memory circuit H (FIG. 2) comprises a comparator 20 whose output is connected to an integrating capacitor 21 which acts as a memory by storing the analog voltage that it receives. A voltage indicative of the level of liquid is thus obtained at the output B of the Darlington circuit 22 by integration of the pulses of the signal at terminal N.

Circuit K includes comparator 23 associated with an RC circuit 30 coupled to one input terminal of the cmparator 23 so as to form an oscillator which supplies a saw-tooth voltage at point D. The five resistors coupled to the other input terminal of the comparator 23 are arranged in the well known configuration of a potentiometer plus a rheostat for adjusting the feed current to the oscillator.

One input of a comparator 24 is connected to point B and the other input is connected to point D, and said comparator consequently supplies a square signal whose width varies with the voltage at point B, i.e. with the level of liquid.

This square signal is applied to the base of a Darlington circuit 25 whose input controls a galvanometer C. The display of the level of liquid is thus permanent, as the galvanometer achieves a mechanical integration of the signals applied thereto.

Circuit L is connected to point R of Circuit A, and the base current of the Darlington circuit 25 is cyclically inhibited and the capacitor 21 every 20 seconds, in the same way as for the capacitor 9 of the detection circuit E. The circuit L is a well known flip-flop which, in response to the signal at terminal R applies a succession of pulse signals to the Darlington circuit 25 for gating the base current thereof. This measurement allows the use of medium quality capacitors, e.g. having a high or low leak resistances.

The invention is more particularly applicable to the detection of the level of oil in the crankcase of an automobile vehicle, the warning lamp 13 and the dial of the galvanometer being disposed on the vehicle's dashboard.

What I claim is:

1. A device for measuring the level of a liquid in a tank comprising a high temperature coefficient sensor immersed in the liquid, a circuit for generating a constant current and connected to the output of the sensor for delivering a voltage indicative of the resistance of the sensor, means for activating cyclically said circuit, a temperature compensating circuit comprising a first comparator to which said voltage is applied and first capacitor connected to the output of said first comparator, the output of said compensating circuit delivering a compensated voltage indicative of the level of the liquid irrespective of the initial liquid and ambient temperature, a memory circuit comprising a second comparator having one input connected to earth and receiving said compensated voltage on the other input and a second capacitor connected to the output of said second comparator, a circuit for generating a saw-tooth signal, a third comparator, the output signal of the memory circuit and the saw-tooth signal circuit being applied to the inputs of said third comparator, and a galvanometer connected to the output of said third comparator.

2. A device as claimed in claim 1, comprising resistance and capacitor means connected between said second and said third comparators for cyclically recharging said second capacitor.

* * * * *